(12) United States Patent
Okuo et al.

(10) Patent No.: US 8,118,432 B2
(45) Date of Patent: Feb. 21, 2012

(54) LENS ARRAY ELEMENT AND PROJECTION TYPE DISPLAY DEVICE

(75) Inventors: Motoyuki Okuo, Osaka (JP); Shigeru Matsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 309 days.

(21) Appl. No.: 12/624,989

(22) Filed: Nov. 24, 2009

(65) Prior Publication Data

US 2010/0171934 A1 Jul. 8, 2010

(30) Foreign Application Priority Data

Nov. 25, 2008 (JP) ................. 2008-299581

(51) Int. Cl.
*G03B 21/14* (2006.01)
*G02B 27/12* (2006.01)
(52) U.S. Cl. ............. 353/38; 353/24; 353/100; 359/619
(58) Field of Classification Search .............. 353/22, 353/24, 38, 100; 359/619, 621, 811, 819
See application file for complete search history.

(56) References Cited

U.S. PATENT DOCUMENTS

2011/0242674 A1* 10/2011 Jibu et al. ................. 359/662

FOREIGN PATENT DOCUMENTS

JP 2005-107410 A 4/2005

\* cited by examiner

*Primary Examiner* — Kevin Pyo
(74) *Attorney, Agent, or Firm* — Hamre, Schumann, Mueller & Larson, P.C.

(57) ABSTRACT

A lens array element has a rectangular plate-like external shape, and includes plate surfaces that functions as light transmission surfaces; and a plurality of cellular lenses that are formed on at least one of the plate surfaces. Each of end faces 4 of the rectangular plate-like external shape forms an inclined surface that slants inward from a plate surface 6 on one side toward a plate surface 2 on the other side, and a reference surface 5 perpendicular to the plate surface is formed on a part of at least two adjoining end faces among the end faces. A front view shape of the reference surface region arranged side-by-side with the inclined surface of the end face is a trapezoid, an oblique side 7 of the trapezoid is disposed so as to extend from a plate surface on one side toward the plate surface 2 on the other side, and an upper side 9 of the trapezoid is disposed on a side of the other of the plate surfaces. Regarding the reference surface provided to the rectangular plate-like end face for optical alignment, the occurrence of inaccuracy due to the releasing properties at the time of molding the lends array element using a metal mold is suppressed.

4 Claims, 5 Drawing Sheets

LENS ARRAY ELEMENT AND PROJECTION TYPE DISPLAY DEVICE

BACKGROUND OF THE INVENTION

1. Field of the Invention

The present invention relates to a lens array element that is mainly used for a projection type image display device and the like, and particularly relates to a lens array element that has an improved reference surface for being positioned with respect to another optical element, and a projection type display device using the same.

2. Description of Related Art

Projection-type image display devices such as projectors are provided with image display elements, such as a liquid crystal panel or a DMD (digital mirror device). Light from a light source such as a lamp is condensed on the image display element, and spatial modulation is performed thereon according to an input image signal. The optical image formed by performing spatial modulation is magnified and projected, thus enabling large screen display.

With such a projection-type image display device, it is important to make a light beam that illuminates the image display element uniformly in its cross section. This is for efficiently transmitting light emitted from the light source to the image display element so as to reduce the optical loss in an optical system of an illumination device, and also for increasing the in-plane uniformity of an image that is magnified and projected onto a screen.

A lens array element that is a plate-like glass optical element is used for the purposes of making an illumination light beam uniform. FIG. 8 shows an example of an optical system for making an illumination light beam uniform. This optical system is an example in which light emitting diodes are used as light sources. Light emitted from light emitting diodes 21 to 23 is first collimated by lenses 24 to 26. The collimated wide light beams are color-combined by a three-color combining prism constituted from prisms 27 to 29 and optical thin films 30 to 31.

The color-combined light is divided by a lens array portion 32 in which a plurality of cellular lenses are disposed in the same plane. The divided light passes through lenses 33 and 34 and a polarization beam splitter 35, and the divided light beams are superimposed on a reflection-type image display element 36, illuminating the image display element 36. The light modulated and reflected by the image display element 36 is projected onto a screen (not shown) by a projection unit 37.

The lens array portion 32 includes a first lens array element 38 disposed on the light source side, and a second lens array element 39 disposed on the side of an object to be illuminated. Each of the lenses constituting the first lens array element 38 has a figure similar to that of the object to be illuminated. Light beams divided by the individual lenses of the first lens array 38 are focused on the image display element 36, while being superimposed, by a corresponding number of divided lenses constituting the second lens array 39. Accordingly, the image display element 36 can be uniformly illuminated.

When the lens array element is installed in the projection-type image display device, it is necessary to position accurately a light transmission surface, which is an optical function surface of the lens array element, with respect to the optical axis of the optical system. If there is displacement between the center of the lens array element and the optical axis, or angular displacement of the lens array element in the horizontal/vertical directions with respect to the optical axis, an accurate optical path cannot be obtained. As a result, the light utilization efficiency is decreased significantly, and a projection image becomes darker. Also, problems such as the occurrence of illuminance unevenness arise.

In order to install a rectangular plate-like lens array element while being accurately aligned with respect to the optical axis, in other words, another optical element, a method of using the end face of the lens array element as a reference surface has been known. When the end face is used as a reference surface, the accuracy of the shape of the end face of the lens array element is significantly important.

JP 2005-107410A discloses a configuration in which, in order to use the end face of a lens array element as a reference surface for alignment, reference surfaces perpendicular to a plate surface are formed on two adjacent end faces of the lens array element using a metal mold. A region other than the reference surface on the end face forms an inclined surface for providing a draft that inclines slightly inward toward the plate surface on the side on which the cellular lenses are formed.

According to such a configuration, accurate positioning using a reference surface can be performed. Specifically, alignment can be easily performed using both of a side corresponding to the vertical direction of the lens array element and a side corresponding to the horizontal direction thereof and, accordingly, it is possible to prevent angle displacement of the lens array element in the horizontal/vertical directions. Since the end face region other than the reference surface forms the inclined surface for providing a draft, it is easy to release the element from the mold after molding. On the other hand, since the reference surface is perpendicular to the plate surface, highly accurate positioning is possible.

Incidentally, the usage of a projection-type image display device has expanded from various business uses for presentations to home use. Along with this, there has been demand for the miniaturization of such apparatuses, so that a demand for the miniaturization and high accuracy of optical components also has become strong.

In the case of forming a lens array element using a metal mold, in order to satisfy demand for a strictly accurate shape, the pressure applied at the time of molding must be set high. Accordingly, it is difficult to release the molded element from the mold unless sufficient draft is provided.

Accordingly, in the configuration disclosed in JP 2005-107410A, only the reference surface is formed so as to be perpendicular to the plate surface so that alignment accuracy is secured, and by forming the other portion of the end face to be an inclined surface for serving as a draft, the releasing properties in a forming step are secured.

However, with such a configuration, a level difference is formed in a boundary portion between the perpendicular reference surface and the inclined surface. Due to this level difference, when releasing the element from the mold, the boundary portion, in other words the side ends of the reference surface region, may be deformed undesirably. Such deformation causes a decline in alignment accuracy.

SUMMARY OF THE INVENTION

Therefore, with the foregoing in mind, it is an object of the present invention to provide a lens array element with which, regarding a reference surface provided to the rectangular plate-like end face for optical alignment, the occurrence of inaccuracy due to releasing the element from a mold when forming it using a metal mold is suppressed.

In order to solve the above-described problems, the lens array element of the present invention has a rectangular plate-like external shape, and includes plate surfaces that function as light transmission surfaces; and a plurality of cellular lenses that are formed on at least one of the plate surfaces. Each of end faces of the rectangular plate-like external shape forms an inclined surface that slants inward from one of the plate surfaces toward another of the plate surfaces, a reference surface perpendicular to the plate surface is formed on a part of at least two adjoining end faces among the end faces, a front view shape of the reference surface region arranged side-by-side with the inclined surface of the end face is a trapezoid, an oblique side of the trapezoid is disposed so as to extend from the one of the plate surfaces toward the other of the plate surfaces, and an upper side of the trapezoid is disposed on a side of the other of the plate surfaces.

Note that the configuration of the present invention can be applied to the case in which the lens array element is molded of resin or the case in which the lens array element is molded of glass.

According to the lens array element that has the configuration described above, the front view shape of the reference surface region arranged side-by-side with the inclined surface of the end face is a trapezoid, and forms a draft similar to the inclined surface of the end face. Accordingly, the releasing properties in a level difference portion can be improved, so that it is possible to obtain an accurate shape without the reference surface region being damaged.

Therefore, the lens array element can be accurately positioned with respect to another optical element; thus, it is possible to position accurately the center of the lens array and the optical axis of the optical system in a projection-type image display device, and the like. Consequently, the light utilization efficiency can be increased so as to keep a projection image bright, and the occurrence of problems such as illuminance unevenness can be avoided.

DETAILED DESCRIPTION OF THE INVENTION

Based on the above-described configuration, the present invention can be modified as described in the following.

Specifically, with a lens array element that has the above-described configuration, it is preferable that the ridgeline portion on the edge of the plate surface is chamfered. Further, it is preferable that a region above the upper side of the trapezoid formed by the reference surface region forms a slanting surface that connects the upper side to a ridgeline portion on an edge of the plate surface. With such configurations, the releasing properties can be improved further.

A projection-type image display device of the present invention includes a light source; an optical illumination system into which light from the light source enters and from which the light is emitted as illumination light; an image display element that modulates the illumination light from the optical illumination system, and forms an image; and an optical projection system that projects light modulated by the image display element on a screen. The optical illumination system includes the lens array element that has any of the above-described configurations, and the lens array element is positioned using the reference surface with respect to another element of the optical illumination system.

Hereinafter, the present invention will be described by way of illustrative embodiments with reference to the drawings.

Figure 1:
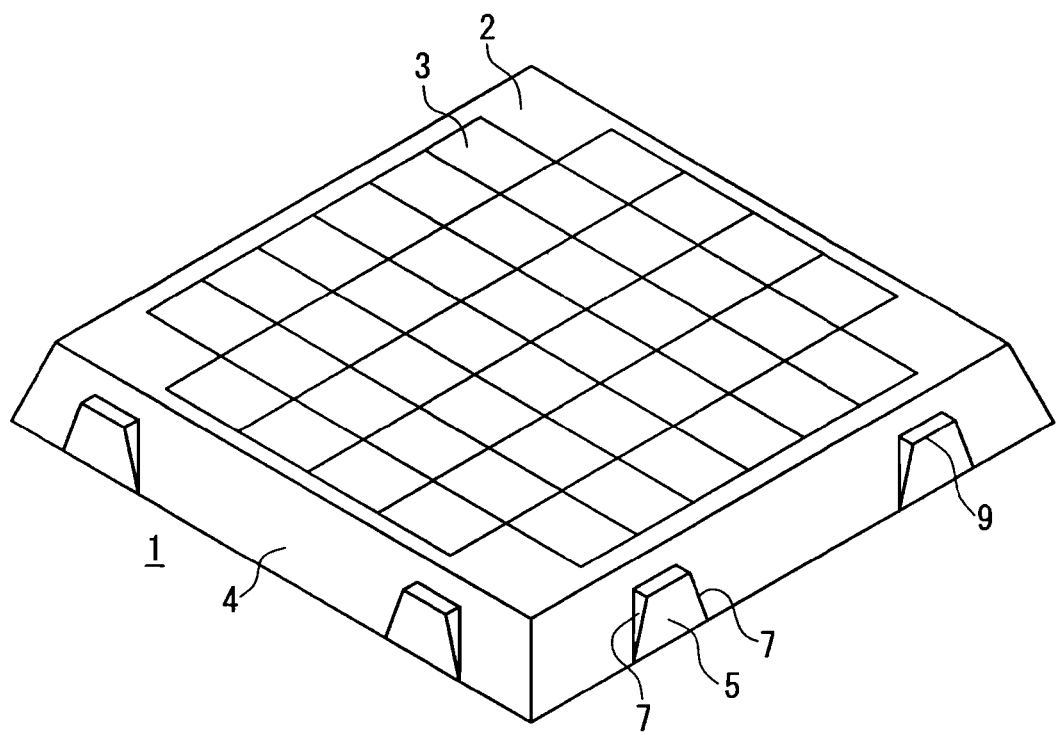
FIG. 1 is a perspective view showing a lens array element according to an embodiment of the present invention.
Figure 2:
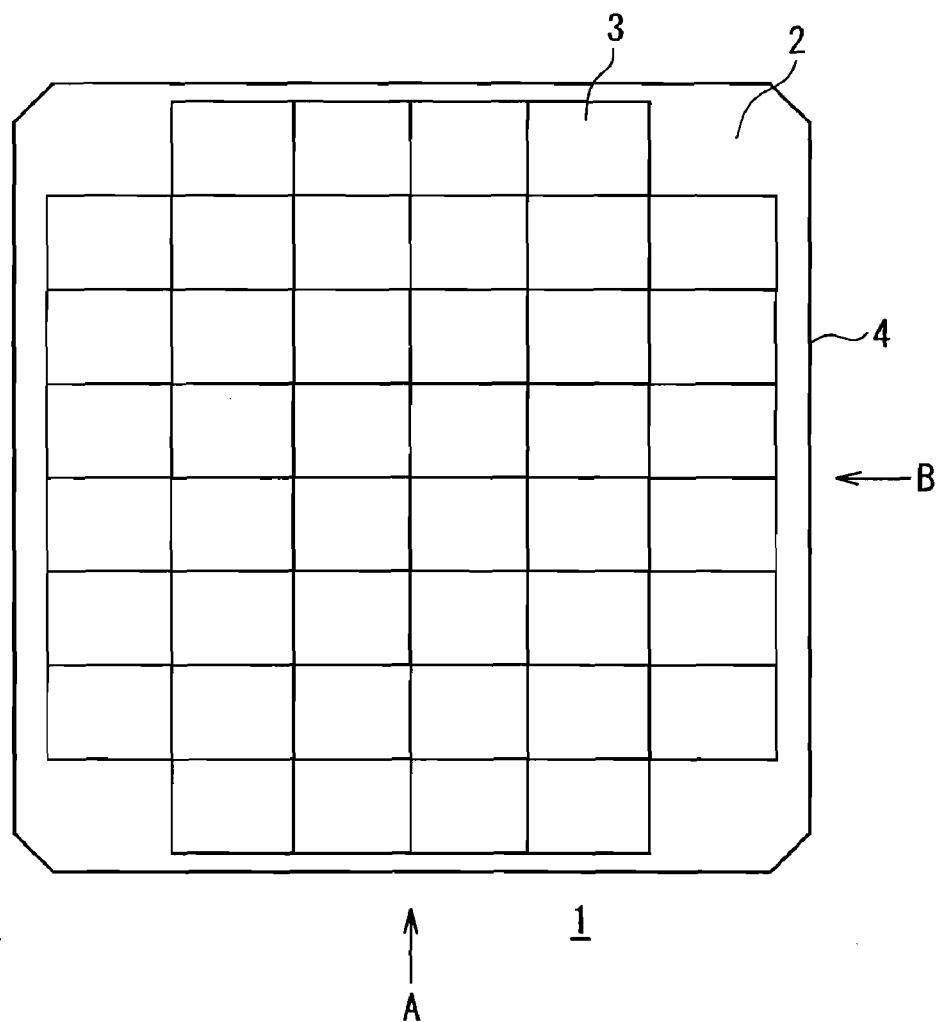
FIG. 2 is a plan view showing the same lens array element.
Figure 3:
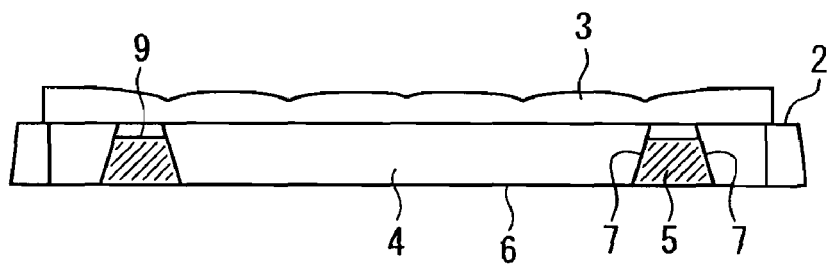
FIG. 3 is a front view seen in the direction of the arrow A in FIG. 2.
Figure 4:
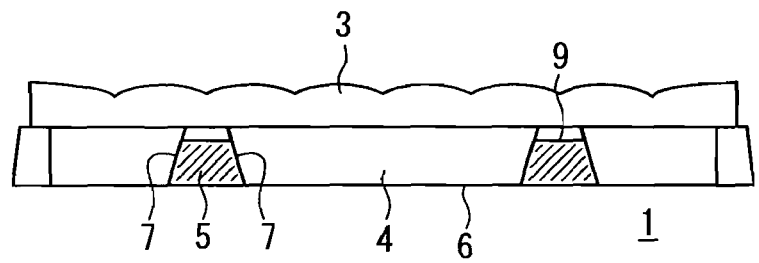
FIG. 4 is a side view seen in the direction of the arrow B in FIG. 2.

FIG. 1 is a perspective view showing a lens array element 1 according to an embodiment of the invention. This lens array element 1 is used for an optical system of a projection-type image display device or the like. FIG. 2 is a plan view showing the lens array element 1. FIG. 3 is a front view seen in the direction of the arrow A in FIG. 2, and FIG. 4 is a side view seen in the direction of the arrow B in FIG. 2. Note that in FIG. 1, portions that form features of this embodiment are illustrated in an exaggerated manner, and a part of details is omitted. Therefore, the shapes of the lens array element 1 shown in FIGS. 2 to 4 may have portions different from those of the shapes shown in FIG. 1. Further, also in the plan view shown in FIG. 2, in order to avoid complicated illustration, details of the shapes of the end face portion shown in FIGS. 3 to 6 are omitted.

As shown in FIGS. 1 to 4, the lens array element 1 has a substantially rectangular plate-like external shape as a whole, and a plate surface thereof is formed as a light transmission surface. A plurality of cellular lenses 3 are formed on an upper surface 2, which is one of the plate surfaces, being arranged in a matrix form. Two reference surfaces 5 are formed on each of two adjoining end faces 4 among the end faces 4 on four sides that form the outer circumference of the lens array element 1. The reference surface 5 is used for positioning when aligning the lens array elements 1 with respect to another optical element.

The end face 4 forms an inclined surface that is inclined so as to slant inward from a back surface 6 side in the drawings toward the upper surface 2 side on which the cellular lenses 3 are formed. The inclined surface of the end face 4 is provided so as to function as a draft (a slight taper to facilitate extraction of a casting) when the lens array element 1 is molded using a metal mold.

Figure 5:
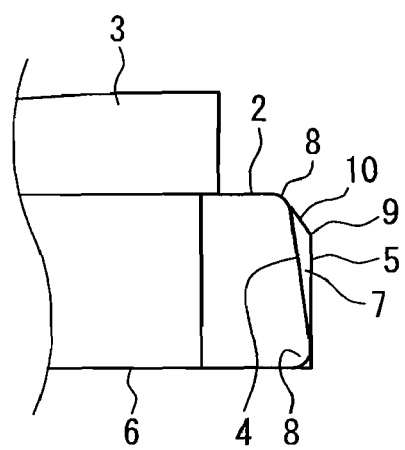
FIG. 5 is an enlarged side view showing an end face 4 region in FIG. 2.

FIG. 5 shows the state of the inclined surface of the end face 4, as an enlarged side view showing a region of the end face 4. On this inclined end face 4, the reference surface 5 is formed so as to be perpendicular to the rectangular plate-like plate surface, in other words, parallel to the optical axis of the cellular lens 3. Accordingly, as clearly shown in FIG. 5, a level difference is formed at the boundary portion between the inclined surface of the end face 4 and the reference surface 5, thus forming a side surface part 7 with respect to the reference surface 5 region. Note that as shown in FIG. 5, the ridgeline portions on the edges of the upper surface 2 and the back surface 6 are chamfered, thus forming rounded portions 8. These rounded portions 8 are also provided in order to improve the releasing properties at the time of molding.

Figure 6:
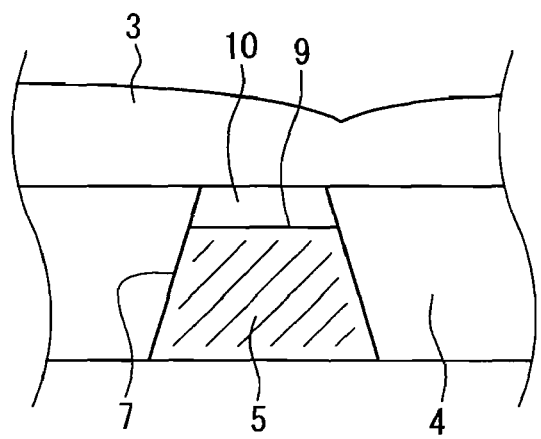
FIG. 6 is an enlarged front view showing a reference surface 5 portion in FIG. 3.

As clearly shown in FIGS. 3 and 4, the front view shape of the reference surface 5 region arranged side-by-side with the inclined surface of the end face 4 is a trapezoid. FIG. 6 shows an enlarged front view showing a region of the reference surface 5. An oblique side of the trapezoid, in other words, the side surface part 7 of the reference surface 5 is disposed so as to extend from the back surface 6 side of the lens array element 1 toward the upper surface 2 side thereof. Thus, the side surface part 7 forms the oblique side of the trapezoid, and the upper surface 2 side of the reference surface 5 forms an upper side 9 of the trapezoid. Eventually, similar to the inclined surface of the end face 4 that slants inward toward the upper surface 2, the oblique side of the trapezoid, in other words the side surface part 7, slants inward in the trapezoid toward the upper surface 2 side.

A region above the upper side 9 of the trapezoid formed by the region of the reference surface 5 forms a slanting surface 10 that connects the upper side 9 to the ridgeline portion on the edge of the upper surface 2. This is also a configuration that improves the releasing properties at the time of molding.

Figure 7:
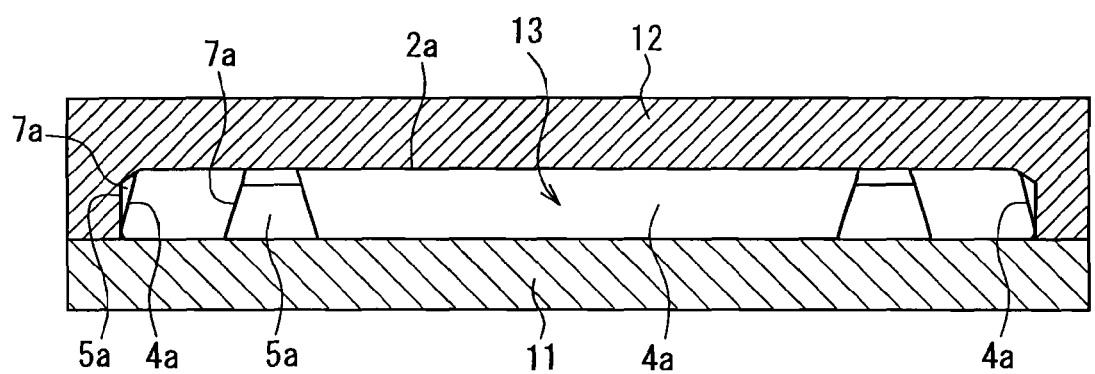
FIG. 7 is a cross-sectional view schematically showing a metal mold used for molding the lens array element according to the embodiment of the present invention.
Figure 8:
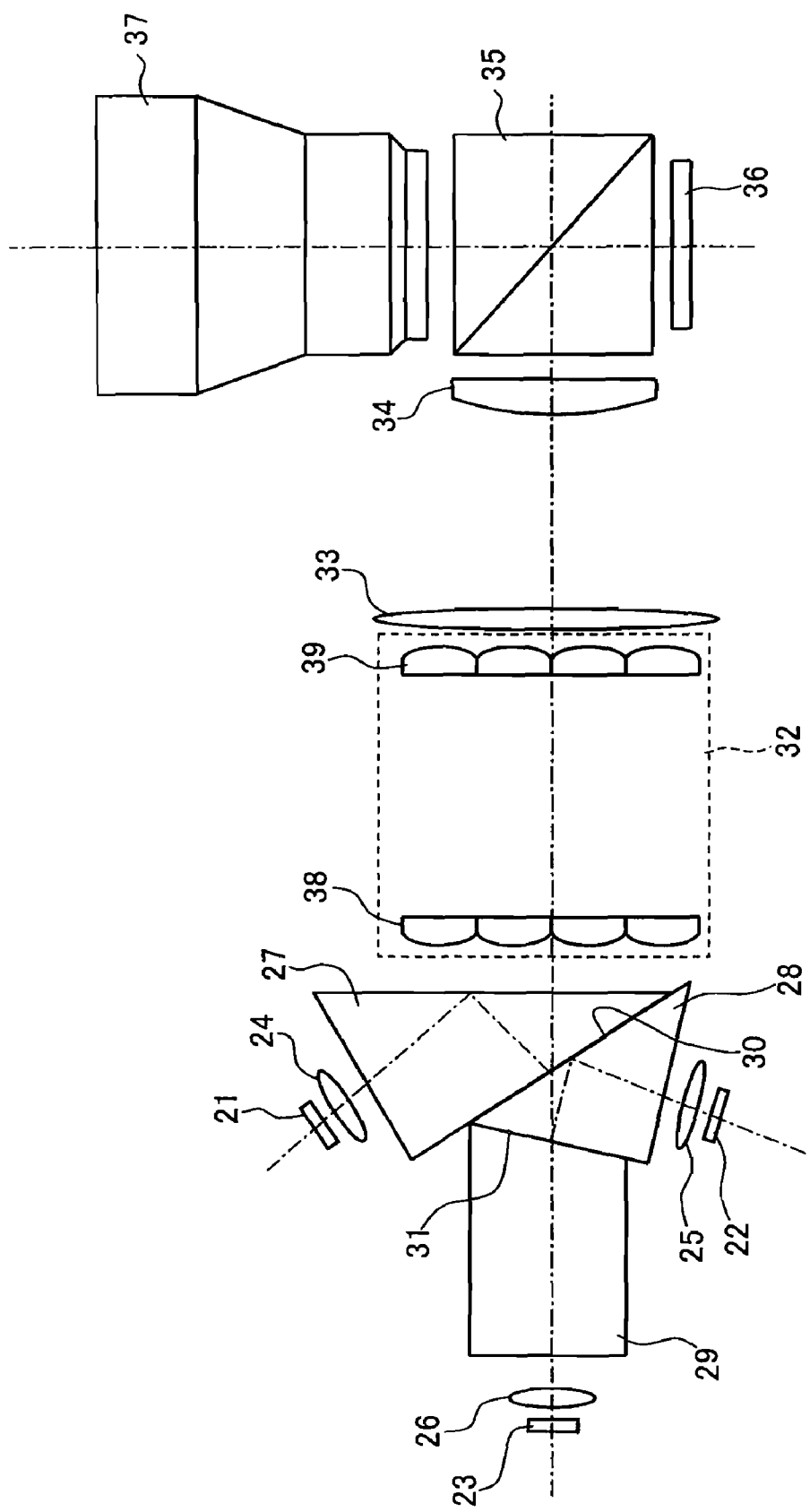
FIG. 8 is a front view schematically showing the configuration of a projection-type image display device to which the lens array element is applied.

The lens array element 1 that has the above-described configuration is formed using a metal mold. FIG. 7 schematically shows a cross section of the metal mold used for molding. The metal mold is constituted of a lower mold 11 and an upper mold 12, and a cavity 13 is formed between the molds. The surface of the lower mold 11 for forming the cavity 13 is flat. The surface of the upper mold 12 for forming the cavity 13 has a shape that corresponds to the lens array element 1. Note that the surface configuration for forming the cellular lenses 3 is not shown in FIG. 7.

The respective portions of the internal surface of the upper mold 12 for forming the cavity 13 are assigned respective reference signs that correspond to the reference signs of the corresponding portions of the lens array element 1 shown in FIG. 1 and the like. Specifically, the numeral parts of the reference signs assigned to the upper mold 12 are the same as those assigned to the corresponding portions of the lens array element 1.

The upper surface 2 of the lens array element 1 is formed by an upper surface forming surface 2*a*, and the end face 4 is formed by an end face forming surface 4*a*. The reference surface 5 is formed by a reference surface forming surface 5*a*, and the side surface part 7 is formed by a side surface part forming surface 7*a*. Molding is performed with this metal mold, and when a molded element is released from the mold, the lower mold 11 and the upper mold 12 are separated in the vertical direction.

It can be seen that the inclination of the end face forming surface 4*a* serves as a draft when a molded element is released from the mold. Although the reference surface forming surface 5*a* does not have a draft, the side surface part forming surface 7*a* forms a draft in the same direction as that of the end face forming surface 4*a*. Accordingly, the releasing properties of the side surface part 7 of the region of the reference surface 5 are improved and, thus, it is possible to obtain an accurate shape without damaging the reference surface 5 region.

In order to confirm the effects of this embodiment as described above, the releasing properties were compared with those in the configuration in which a front view shape of the reference surface 5 is not a trapezoid, but a rectangle. As a result, it was found that, when the front view shape of the reference surface 5 is a rectangle, unpreferable deformation occurs in the vicinity of a side surface part (corresponding to the side surface part 7) after being formed, which affects positioning using the reference surface 5. Further, it was found that, as described in this embodiment, even with the structure in which the reference surface 5 does not have a draft, if the front view shape of the reference surface 5 is a trapezoid so as to provide the side surface part 7 with a draft, it is possible to suppress sufficiently the occurrence of deformation that affects the function of the reference surface 5 when releasing the element from the mold.

The lens array element 1 that has the configuration as described above can be incorporated into an optical system of a projection-type image display device or the like as follows, for example. A frame has an opening corresponding to the surface of the lens array element 1 on which the cellular lenses 3 are formed and is provided with a frame reference surface that is to be faced the end face 4 of the lens array element 1. The reference surfaces 5 formed on two adjoining sides of the lens array element 1 are brought into contact with and fitted in the frame reference surfaces. Then, the end face 4 of the lens array element 1 that is opposite the reference surface 5 is pressed by a pressing member fixed to the frame. Thereby, the reference surface 5 of the lens array element 1 is positioned accurately by the frame reference surface. The frame is positioned precisely and fixed on the optical path of the optical system, so that the optical axis matches that of another optical component.

With the lens array element 1 according to this embodiment, since the cellular lenses 3 and the reference surface 5 are molded integrally using the metal mold, the distance from the reference surface 5 to the center of the lens array mostly is determined by the accuracy of the metal mold, so that the stability of the accuracy quality is high. In addition, since the reference surface 5 is formed so as to be perpendicular to the rectangular plate-like plate surface of the lens array element 1, when the reference surface 5 is brought into contact with the frame reference surface, accurate positioning is possible. Further, with respect to the pressure for fixing the lens array element 1 to the frame, it is possible to keep stably the positional relationship between the reference surface 5 and the frame reference surface, avoiding position displacement due to such pressure.

Note that in the example of the lens array element 1 described above, although the reference surfaces 5 are formed on two adjoining end faces 4 of the end faces 4 on four sides, the configuration is not limited to this. It is also possible to employ a configuration in which the reference surfaces 5 are also formed on the other end faces 4 at the same time.

Further, the configuration in the above-described embodiment can be applied to both the case in which the lens array element is molded of resin and the case in which the lens array element is molded of glass.

As described above, according to the lens array element of the present invention, an accurate shape can be obtained for the reference surface provided to the end face of the plate-like external shape thereof and positioning can be accurately performed with respect to another optical element; thus, the lens array element is suitable for use in a projection-type display device and the like.

What is claimed is:

1. A lens array element that has a rectangular plate-like external shape, comprising plate surfaces that functions as light transmission surfaces; and a plurality of cellular lenses that are formed on at least one of the plate surfaces, wherein
   each of end faces of the rectangular plate-like external shape forms an inclined surface that slants inward from one of the plate surfaces toward another of the plate surfaces,
   a reference surface perpendicular to the plate surface is formed on a part of at least two adjoining end faces among the end faces,
   a front view shape of the reference surface region arranged side-by-side with the inclined surface of the end face is a trapezoid, an oblique side of the trapezoid is disposed so as to extend from the one of the plate surfaces toward the other of the plate surfaces, and an upper side of the trapezoid is disposed on a side of the other of the plate surfaces.

2. The lens array element according to claim 1, wherein a ridgeline portion on an edge of the plate surface is chamfered.

3. The lens array element according to claim 1,
wherein a region above the upper side of the trapezoid formed by the reference surface region forms a slanting surface that connects the upper side to a ridgeline portion on an edge of the plate surface.

4. A projection-type image display device, comprising:

a light source;

an optical illumination system into which light from the light source enters and from which the light is emitted as illumination light;

an image display element that modulates the illumination light from the optical illumination system, so as to form an image; and an optical projection system that projects light modulated by the image display element on a screen, wherein the optical illumination system includes the lens array element according to claim 1, and the lens array element is positioned by the reference surface with respect to another element of the optical illumination system.

* * * * *